United States Patent
Panda et al.

(10) Patent No.: US 12,455,887 B2
(45) Date of Patent: Oct. 28, 2025

(54) ONLINE POST-PROCESSING IN RANKINGS FOR CONSTRAINED UTILITY MAXIMIZATION

(71) Applicant: Oracle International Corporation, Redwood City, CA (US)

(72) Inventors: Swetasudha Panda, Burlington, MA (US); Ariel Kobren, Cambridge, MA (US); Jean-Baptiste Frederic George Tristan, Burlington, MA (US); Michael Louis Wick, Lexington, MA (US)

(73) Assignee: Oracle International Corporation, Redwood City, CA (US)

( * ) Notice: Subject to any disclaimer, the term of this patent is extended or adjusted under 35 U.S.C. 154(b) by 188 days.

(21) Appl. No.: 17/368,544

(22) Filed: Jul. 6, 2021

(65) Prior Publication Data

US 2022/0050848 A1 Feb. 17, 2022

Related U.S. Application Data

(60) Provisional application No. 63/066,044, filed on Aug. 14, 2020.

(51) Int. Cl.
*G06F 16/2457* (2019.01)
*G06F 16/28* (2019.01)
*G06N 20/00* (2019.01)

(52) U.S. Cl.
CPC ...... *G06F 16/24578* (2019.01); *G06F 16/285* (2019.01); *G06N 20/00* (2019.01)

(58) Field of Classification Search
CPC .. G06F 16/24578; G06F 16/285; G06N 20/00
See application file for complete search history.

(56) References Cited

U.S. PATENT DOCUMENTS

| | | | | |
|---|---|---|---|---|
| 11,003,672 | B2* | 5/2021 | Chan | G06F 16/9535 |
| 2012/0059686 | A1* | 3/2012 | Williams | G06Q 10/06375 |
| | | | | 705/7.37 |
| 2013/0151495 | A1* | 6/2013 | Bennett | G06F 16/953 |
| | | | | 707/706 |
| 2018/0075034 | A1* | 3/2018 | Wang | G06F 16/24578 |
| 2020/0151191 | A1* | 5/2020 | Agrawal | G06F 16/2457 |

(Continued)

OTHER PUBLICATIONS

Fairness-Aware Ranking in Search & Recommendation Systems with Application to LinkedIn Talent Search (Year: 2019).*

(Continued)

*Primary Examiner* — Sherief Badawi
*Assistant Examiner* — Earl Levi Elias
(74) *Attorney, Agent, or Firm* — S. Scott Foster; Kowert, Hood, Munyon, Rankin & Goetzel, P.C.

(57) ABSTRACT

Online post-processing may be performed for rankings generated with constrained utility maximization. A stream of data items may be received. A batch of data items from the stream may be ranked according to a ranking model trained to rank data items in a descending order of relevance. The batch of data items may be associated with a current time step. A re-ranking model may be applied to generate a re-ranking of the batch of data items according to a re-ranking policy that considers the current batch and previous batches with regard to a ranking constraint. The re-ranked items may then be sent to an application.

20 Claims, 9 Drawing Sheets

(56) References Cited

U.S. PATENT DOCUMENTS

| | | | |
|---|---|---|---|
| 2020/0372406 A1 | 11/2020 | Wick et al. | |
| 2020/0372472 A1* | 11/2020 | Kenthapadi | G06F 16/24578 |
| 2021/0125108 A1* | 4/2021 | Metzler, Jr. | G06F 16/93 |
| 2021/0383268 A1* | 12/2021 | Miroshnikov | G06N 20/00 |

OTHER PUBLICATIONS

Abolfazl Asudeh, HV Jagadish, Julia Stoyanovich, and Gautam Das. 2019. "Designing Fair Ranking Schemes". In Proceedings of the 2019 International Conference on Management of Data. 1259-1276, arXiv e-print: arXiv:1712.09752, pp. 1-6.

Alex Beutel, Jilin Chen, Tulsee Doshi, Hai Qian, Li Wei, Yi Wu, Lukasz Heldt, Zhe Zhao, Lichan Hong, Ed H. Chi, and Cristos Goodrow. 2019. "Fairness in Recommendation Ranking through Pairwise Comparisons". arXiv e-pint: arXiv:1903.00780 [cs.CY], pp. 1-16.

Asia J Biega, Krishna P Gummadi, and Gerhard Weikum. 2018. "Equity of attention: Amortizing individual fairness in rankings". © 2018 Association for Computing Machinery. In The 41st international ACM SIGIR conference on research & development in information retrieval. pp. 405-414.

Jaime Carbonell and Jade Goldstein. 1998. "The Use of MMR, Diversity-Based Reranking for Reordering Documents and Producing Summaries". In Proceedings of the 21st annual international ACM SIGIR conference on Research and development in information retrieval. pp. 335-336.

L Elisa Celis, Anay Mehrotra, and Nisheeth K Vishnoi. 2020. "Interventions for ranking in the presence of implicit bias". In Proceedings of the 2020 Conference on Fairness, Accountability, and Transparency (369-380), arXiv preprint: arXiv:2001.08767, pp. 1-53.

L Elisa Celis, Damian Straszak, and Nisheeth K Vishnoi. 2017. "Ranking with Fairness Constraints". arXiv preprint arXiv:1704.06840 (2017), pp. 1-32.

Kai-Wei Chang, Akshay Krishnamurthy, Alekh Agarwal, John Langford, and Hal Daumé III. "Learning to search better than your teacher". In Proceedings of the 32nd International Conference on Machine Learning, PMLR 37:pp. 2058-2066, 2015.

Alexandra Chouldechova and Aaron Roth. 2018. "The Frontiers of Fairness in Machine Learning". arXiv preprint arXiv:1810.08810 (2018), pp. 1-13.

Sam Corbett-Davies and Sharad Goel. 2018. "The Measure and Mismeasure of Fairness: A Critical Review of Fair Machine Learning". arXiv preprint arXiv:1808.00023 (2018), pp. 1-25.

Yifan Guan, et al. "Mithraranking: A system for responsible ranking design". © 2019 Association for Computing Machinery, In Proceedings of the 2019 International Conference on Management of Data. Jun. 2019, pp. 1913-1916.

Moritz Hardt, Eric Price, and Nathan Srebro. 2016. "Equality of Opportunity in Supervised Learning". Part of Advances in Neural Information Processing Systems 29 (NIPS 2016), abs/1610.02413, arXiv preprint arXiv:1610.02413 (2016), pp. 1-22.

Hans Hofmann. 1994. "Statlog (german credit data) data set," printed from the UCI Repository of Machine Learning Databases at http://archive.ics.uci.edu/ml/datasets/Statlog+%28German+Credit+Data%29, (1994), pp. 1-5.

Thorsten Joachims, Adith Swaminathan, and Tobias Schnabel. 2016. "Unbiased Learning-to-Rank with Biased Feedback". arXiv:1608.04468 [cs.IR], pp. 1-10.

Matthew Kay, Cynthia Matuszek, and Sean A Munson. "Unequal repre-sentation and gender stereotypes in image search results for occupations". In Proceedings of the 33rd Annual ACM Conference on Human Factors in Computing Systems. Apr. 2015, pp. 3819-3828.

Caitlin Kuhlman, MaryAnn VanValkenburg, and Elke Rundensteiner. "FARE: Diagnostics for Fair Ranking using Pairwise Error Metrics". In The World Wide Web Conference, ACM, May 2019, pp. 2936-2942.

Juhi Kulshrestha, Motahhare Eslami, Johnnatan Messias, Muhammad Bilal Zafar, Saptarshi Ghosh, Krishna P Gummadi, and Karrie Karahalios. "Quantifying search bias: Investigating sources of bias for political searches in social media". In Proceedings of the 2017 ACM Conference on Computer Supported Cooperative Work and Social Computing. Feb. 2017, pp. 417-432.

Matevž Kunaver and Tomaž Požrl. 2"Diversity in recommender systems—A survey". Science Direct, Elsevier, Knowledge-Based Systems v. 123, May 2017, pp. 154-162.

Swetasudha Panda, J. Tristan, M. Wick, Haniyeh Mahmoudian, and P. Kanani. "Using Bayes Factors to Control for Fairness Case Study on Learning To Rank", 33rd Conference on Neural Information Processing Systems (NeurIPS 2019), Vancouver, Canada, 2019, pp. 1-14.

Steffen Rendle, Christoph Freudenthaler, Zeno Gantner, and Lars Schmidt-Thieme. 2012. "BPR: Bayesian Personalized Ranking from Implicit Feedback". Appears in Proceedings of the Twenty-Fifth Conference on Uncertainty in Artificial Intelligence (UAI2009), arXiv preprint arXiv:1205.2618 (2012), pp. 452-461.

Tetsuya Sakai and Ruihua Song. "Evaluating diversified search results using per-intent graded relevance". In Proceedings of the 34th international ACM SIGIR conference on Research and development in Information Retrieval, Jul. 2011, pp. 1043-1052.

Piotr Sapiezynski, Wesley Zeng, Ronald E Robertson, Alan Mislove, and Christo Wilson. "Quantifying the Impact of User Attention on Fair Group Representation in Ranked Lists". WWW '19: Companion Proceedings of The 2019 World Wide Web Conference, May 2019, pp. 553-562.

Hinrich Schutze, Christopher D Manning, and Prabhakar Raghavan. 2008. "Introduction to information retrieval". vol. 39. Cambridge University Press Cambridge 2008, Online (2009) version, pp. 1-568.

Ashudeep Singh and Thorsten Joachims. "Fairness of Exposure in Rankings," In Proceedings of the 24th ACM SIGKDD International Conference on Knowledge Discovery & Data Mining, Jul. 2018, pp. 2219-2228.

Ashudeep Singh and Thorsten Joachims. 2019. "Policy learning for fairness in ranking". In Advances in Neural Information Processing Systems. pp. 5426-5436.

Julia Stoyanovich, Ke Yang, and HV Jagadish. 2018. "Online set selection with fairness and diversity constraints". In Proceedings of the EDBT Conference, pp. 241-252.

Ke Yang and Julia Stoyanovich. "Measuring fairness in ranked outputs," In Proceedings of the 29th International Conference on Scientific and Statistical Database Management, Jun. 2017, arXiv preprint: arXiv:1610.08559, pp. 1-5.

Muhammad Bilal Zafar, Isabel Valera, Manuel Gomez-Rodriguez, and Krishna P Gummadi. 2019. "Fairness Constraints: A Flexible Approach for Fair Classification," Journal of Machine Learning Research 20 (2019), pp. 1-42.

Muhammad Bilal Zafar, Isabel Valera, Manuel Gomez Rogriguez, and Krishna P Gummadi. "Fairness constraints: Mechanisms for fair classification," In Proceedings of the 20th International Conference on Artificial Intelligence and Statistics, PMLR 54: pp. 962-970, 2017.

Meike Zehlike, Francesco Bonchi, Carlos Castillo, Sara Hajian, Mohamed Megahed, and Ricardo Baeza-Yates, "FA*IR: A Fair Top-k Ranking Algorithm". In Proceedings of the 2017 ACM on Conference on Information and Knowledge Management, Nov. 2017, pp. 1569-1578.

Meike Zehlike and Carlos Castillo. "Reducing disparate exposure in ranking: A learning to rank approach". In Proceedings of The Web Conference 2020, Apr. 2020, pp. 2849-2855.

Rich Zemel, Yu Wu, Kevin Swersky, Toni Pitassi, and Cynthia Dwork. "Learning fair representations", Proceedings of the 30th International Conference on Machine Learning, PMLR 28(3): 2013, pp. 325-333.

U.S. Appl. No. 16/914,099, filed Jun. 26, 2020, Tristan, et al.

* cited by examiner

ONLINE POST-PROCESSING IN RANKINGS FOR CONSTRAINED UTILITY MAXIMIZATION

RELATED APPLICATIONS

This application claims benefit of priority to U.S. Provisional Application Ser. No. 63/066,044 entitled "Online Post-Processing In Rankings For Constrained Utility Maximization," filed Aug. 14, 2020, and which is incorporated herein by reference in its entirety.

BACKGROUND

Field of the Disclosure

This disclosure relates to re-ranking data sets to improve ranking performance in machine learning.

Description of the Related Art

Machine learning systems are increasingly employed to improve decision making in business applications. For example, ranking systems may implement machine learning-based ranking models in areas as diverse as online marketing, job search and candidate screening, property listings and rentals, loan applications, social media feeds, web search queries, and personalized recommendations, among others. Depending on the application, such models are used to rank products, job candidates, credit profiles, or other information utilized in these applications. Ultimately, these ranking models may facilitate decision making which involve selecting specific items from the ranked list.

SUMMARY

Techniques for performing online post-processing for rankings in constrained utility maximization are described. Data items to be ranked may be received in an online environment, which may include a stream of data items. The stream of data items may be processed in batches. Rankings for the batches of data items from the stream may be determined using a trained ranking model. Post-ranking processing may also be performed online by applying a re-ranking model that considers a current batch and previous batches when re-ranking the current batch to satisfy a fairness constraint. The re-ranked items may then be sent to an application for which they are ranked.

Figure 1:
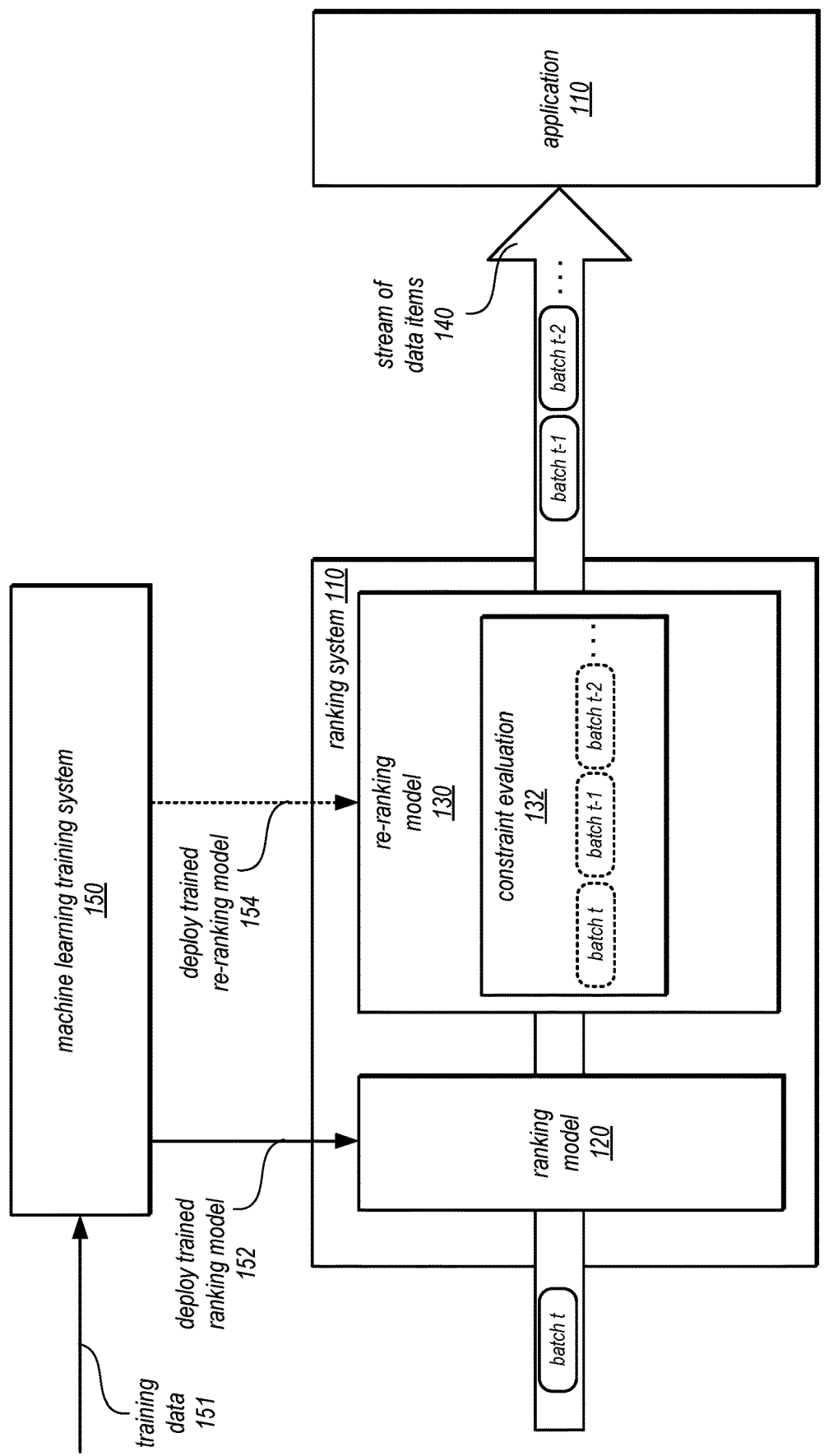
FIG. 1 is a logical block diagram of an exemplary ranking system, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for online post-processing in rankings for constrained utility maximization are described herein. Many practical instantiations of ranking systems are online processes where there is an incoming stream of batches of items to be ranked. Consider, for example, a hiring application, in which a job advertisement elicits applicants which naturally arrive over time. The entity which posts the advertisement processes these applications in batches to screen and select candidates for job interviews. Unlike a static ranking system, such an online ranking system may use proactive decision making so as to maximize long-term utility. In the example hiring application, this can be implemented to make selections of qualified candidates given an unknown distribution over the batches of applicants.

In various scenarios, the position of an item in a ranking may directly influence its visibility, and thereby affect a decision made for that item, (e.g., whether the item is selected or not). Some techniques for ranking may order items in descending order of relevance which is an assessment relative to the objective based on which the items are ranked. For example, in a hiring application that considers applications submitted in response to a job advertisement, relevance can be quantified as the amount by which an applicant's qualifications match the job requirements. As various different applications may utilize ranking techniques, different measures of relevance for ordering items may be applicable in different embodiments. These ranking techniques may be referred to as utility maximizing ranking techniques, in various embodiments. However, utility maximizing ranking techniques can lead to representation disparities in the generated rankings, either in the static or online environment.

Fairness techniques in machine learning may be implemented to alleviate discrimination by enforcing adherence to specific fairness criteria or other fairness constraints. While fairness techniques for ranking models in ranking systems have applied a variety of fairness constraints (e.g., parity of visibility or exposure) to static ranking systems, such techniques could lead to a ranking system that adheres to the fairness constraints with respect to a distribution of training data, which may cause violations of the fairness constraints on data that is actually submitted to the ranking system (e.g., non-training data).

In various embodiments, online post-processing in rankings for constrained utility maximization may be implemented to satisfy ranking constraints (e.g., fairness constraints or other ranking constraints, such as parity constraints) while maximizing utility, in online ranking systems. In various embodiments, ranking constraints may be assigned prior to deployment of an online ranking system and may be applicable for many different types of ranking constraints. One example embodiment (of many different possible embodiments) discussed throughout is a fairness constraint with respect to demographic parity criteria as parity of pairwise exposures of protected groups over an aggregate of observed ranking batches. Parity constraints may also be implemented to illustrate how, for example, ranking systems can utilize online post-processing techniques to consider features beyond fairness considerations. In one such example, parity constraints may be used to incorporate diversity in rankings. Ranking constraints used for ranking systems other than parity constraints, however, may be implemented in various embodiments.

In various embodiments, an incoming stream of batches of items that need to be ranked for a specific application may be received. In various embodiments, a ranking model may generate a ranking from each batch at a given time step. In various embodiments, a decision may be made whether (and how) to re-rank the batch in order to maximize cumulative utility while enforcing a ranking criteria. In various embodiments, online post-processing for online ranking systems may be implemented to make such a decision. Instead of a classifier as in offline post-processing for classification as discussed earlier, the ranking model may be considered as part of post-processing. For instance, rather than deploying a derived classifier, a sequence of two models may be deployed: the first is the initial trained ranking model and the second is a re-ranking model that guarantees that the ranking constraints are satisfied according to an applied re-ranking policy, in various embodiments. In this way, online post-processing can address concept drift in distribution from training data to future data when the application is deployed. Online post-processing techniques may also then address ranking constraint violations at each time step, while providing a framework for continuous monitoring of the ranking system.

In various embodiments, online post-processing in rankings for constrained utility maximization may be implemented to address an unknown distribution over ranking batches. As discussed below, in some embodiments, a re-ranking policy for the re-ranking model may be a deterministic policy, such as the techniques discussed below with regard to Fair Queues technique and Greedy Fair Swap technique. As discussed below, in various embodiments, a re-ranking policy for the re-ranking model may be learned via learning to search techniques. For example, in various embodiments, locally optimal learning to search with queues (L2SQ), may be implemented to learn from training examples collected using a reference policy. In various embodiments, a queue for deterministic re-ranking policies (e.g., Fair Queues) or learned re-ranking policies (e.g., a re-ranking policy learned using L2SQ) may be created for each group in decreasing order of relevance followed by construction of a full ranking by iteratively selecting the top item in each queue, while accounting for the ranking constraint, as discussed in detail below with regard to FIG. 2.

In some embodiments, online post-processing in rankings for constrained utility maximization may rely upon various features which may be described as follows. Consider a batch of n items $i \in 1, 2, \ldots n$. Let $r(i)$ denote the rank of item i in ranking r, and let $\tau \in R_n$ denote a single ranking. Exposure of an item i under the ranking r may be:

$$\text{Exposure } (i, r) = \frac{1}{\log(r(i) + 1)}$$

In some embodiments, $q(i)$ may be the relevance of item i. The discounted cumulative gain (DCG) of a ranking, r, may be:

$$DCG(r) = \sum_{i=1}^{n} \frac{2^{q(i)} - 1}{\log(r(i) + 1)}$$

In some embodiments, the normalized DCG (nDCG) of r may be $$\frac{DCG(r)}{DCG(r^*)},$$

where r* may be the ranking in which items are ordered by decreasing relevance.

In various embodiments, each item, i, in the batch may be a member of a group, $g(i)$. In some example embodiments, a ranking constraint may be evaluated according to fairness, using a fairness ranking constraint (which may also be referred to herein as a "fairness constraint"). A fair ranking may be one that equalizes exposure across groups. Let $G_j = \{i \in [n] | g(i) = j\}$ be a group of items. Then, in some embodiments, the exposure of $G_j$ in a ranking r may be:

$$\text{Exposure}(G_j \mid r) = \sum_{i \in G_j} \text{Exposure}(i \mid r)$$

In some embodiments, analogous to demographic parity constraints in classification, a demographic disparity (DDP) constraint may be an example of a fairness constraint that bounds the difference in mean exposures between all pairs of groups, and thus may be described as:

$$DDP(r) = \max_{\{G_j, G_{j'}\}} \frac{\text{Exposure}(G_j, r)}{|G_j|} - \frac{\text{Exposure}(G_{j'}, r)}{|G_{j'}|}$$

In this example, a fairness constraint may ensure that DDP is less than a predetermined threshold $\alpha$. This constraint may be relaxed when compared with other demographic parity constraints, in some embodiments. In various embodiments, techniques may be implemented to maximize nDCG while satisfying the fairness constraint (e.g., DDP in the above example case). Such techniques can be adapted and used for other fairness constraints, in some embodiments.

In various embodiments, an online environment may be one where items arrive over time in batches. At each time step $t \in \{1, \ldots, T\}$, a batch of items was ranked by a fixed initial ranking model descending score order (e.g., the ranking is denoted as $r_{init}^{(t)}$).

A re-ranking policy (which also may be referred to as a post-processing policy) may be represented as re-ranking policy $\pi$ to re-rank the items in each batch according to a new ranking $r^{(t)}$ containing group populations $G_j^{(t)}$, such that nDCG is maximized and the fairness ranking constraint is satisfied. However, in this environment, nDCG and the fairness ranking constraint apply in aggregate over batches. For example, it may be that for any time step t the demographic disparity nDCG at time t for some sequence of rankings $R = \{r^{(1)}, \ldots, r^{(t)}\}$, nDCG(R,t), may be described, in some embodiments, as:

$$\frac{1}{t} \sum_{s=1}^{t} nDCT(r^{(s)})$$

In some embodiments, the DDP at t may be described as:

$$\max_{\{G_j, G_{j'}\}} \frac{\sum_{s=1}^{t} \text{Exposure}(G_j^{(s)} \mid r^{(s)})}{\sum_{s=1}^{t} |G_j^{(s)}|} - \frac{\sum_{s=1}^{t} \text{Exposure}(G_{j'}^{(s)} \mid r^{(s)})}{\sum_{s=1}^{t} |G_{j'}^{(s)}|}$$

In various embodiments, $\pi$ may use all rankings $\{r^{(s)}\}_{s=1}^{t-1} \cup \{r_{init}^{(t)}\}$ to compute the utility and the constraints in aggregate. However, $\pi$ may only re-rank the current batch and not any of the previous batches. By re-ranking the current batch, re-ranking policy may satisfy the fairness ranking constraint (in aggregate) while maximizing cumulative utility over the batches observed so far. A goal in online post-processing may be to maximize nDCG(R,T) subject to the constraint $\max_{1 \leq t \leq T} DDP(R,t) \leq \alpha$. In some embodiments, fair ranking may be used to denote an aggregate of ranking batches up to a give (e.g., current) time step, which satisfy our DDP fairness constraint.

FIG. 1 is a block diagram of an exemplary ranking system, according to some embodiments, which may implement online post-processing in rankings for constrained utility maximization. As discussed above, an application, such as application 110 (which may be implemented by one or more computing devices, such as computer system 1000 discussed below with regard to FIG. 9), may utilize rankings of data items in various contexts for different services or functions. In some embodiments, the stream of data items 140 may be initially collected by application 110, whereas in other embodiments, stream of data items 140 may be collected by a different application that can then be used by application 110 once ranked.

In some embodiments, a request or other instruction to configure, set-up, initiate or otherwise cause performance of rankings of data items on behalf of application 110 may be sent to ranking system 110 (not illustrated). For example, application 110 may send a request for the ranked stream of data items 140 to ranking system 110. In some embodiments, the request or other instruction to configure, set-up, initiate or otherwise cause performance of rankings of data items may configure ranking model 120 and/or re-ranking model 130. Such a request may, for instance, specify if a learned or deterministic re-ranking policy may be applied to re-rank items.

Ranking system 110 (which may be implemented by one or more computing devices, such as computer system 1000 discussed below with regard to FIG. 9) as part of network-based or cloud-based service, private system, or various other contexts may provide ranked items to application 110. For example, ranking system 110 may implement an interface (e.g., a programmatic interface, such as Application Programming Interface (API)) to format and communicate stream of data items 140 to application 110. As illustrated in FIG. 1, ranking system may apply both ranking model 120, which may provide an initial ranking for a batch of items. Ranking model 120 may be trained, in some embodiments, by machine learning training system 150, which may train ranking model 120 using training data 151 (e.g., data items in one or more batches).

Ranking system 110 may also implement re-ranking model 130, which may evaluate a ranking constraint at 132, as discussed above and below with respect to FIGS. 2-6, with respect to batches of times earlier than a current time step t (e.g., batch t, batch t–1, batch t–2, and so on). As discussed in detail below, re-ranking model 130 may utilize various re-ranking policies, such as deterministic policies and/or learned policies. The re-ranked items may be provided as a finally ranked batch of items to application 110, in various embodiments.

Figure 2:
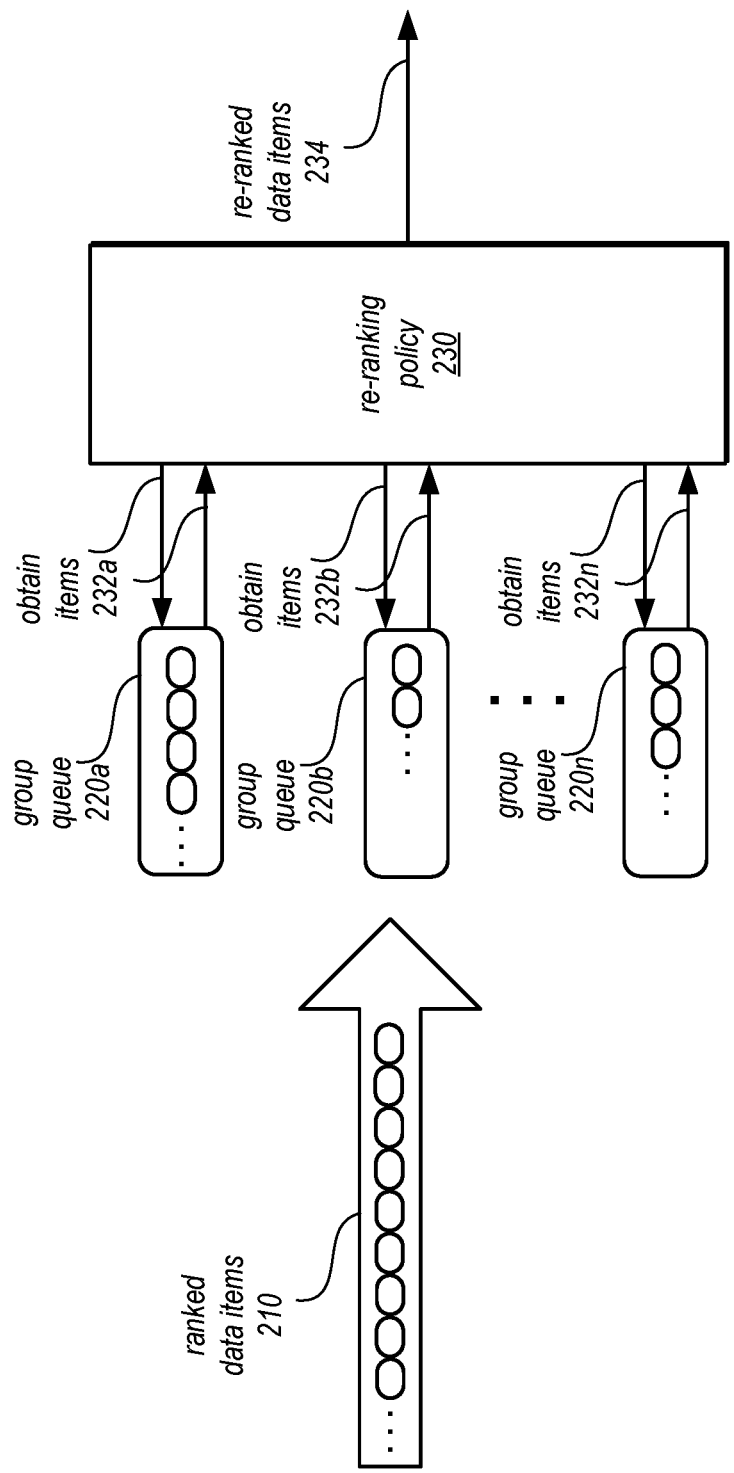
FIG. 2 is a logical block diagram illustrating queues for re-ranking items according to a re-ranking policy, according to some embodiments.

FIG. 2 is a logical block diagram illustrating queues for re-ranking items according to a re-ranking policy, according to some embodiments. As noted above, queues may be used to generate re-rankings of items in order to satisfy a ranking constraint. As indicated at 210, ranked data items (e.g., ranked according to ranking model 120 discussed above with regard to FIG. 1), may be obtained and placed into a corresponding group queue, such as group queue 220a, 220b or 220n. In at least some embodiments, groups may correspond to different attributes or characteristics that may be used to determine whether or not a ranking constraint is satisfied. For example, groups can correspond to different attributes, such as protected or non-protected groups for DDP analysis or other groupings for parity analysis (e.g., diversity constraints). In at least some embodiments, one data item may be a member of those and thus be placed in only one group queue 220 (e.g., an item of group A will be placed in group queue 220a and not in group queue 220b or 220n). In some embodiments, group queues 220 may be priority queues which prioritize, and thus order, items according to some priority value (e.g., relevance to an application, as discussed above).

Re-ranking policy 230 may then apply the various features of the re-ranking policy (e.g., a learned or deterministic policy) to obtain items 232 from different group queues 220 in order to generate the re-ranked data items 234. For example, a modified FA*IR technique (also referred to as Fair Queues), as discussed below, or other deterministic re-ranking policy may select the next (e.g., most relevant data item) in a group queue 220 before taking a next data item in a next group queue 220. For example, re-ranking policy 230 may be applied to obtain a next data item 232a from group queue 220a, then a next data item 232b from group queue 232b, and then a next data item 232n from group queue 232n. The previous example pattern, as well as other example patterns or decisions for choosing which group queue 220 to obtain from may be described in an applied re-ranking policy, in some embodiments.

Figure 3:
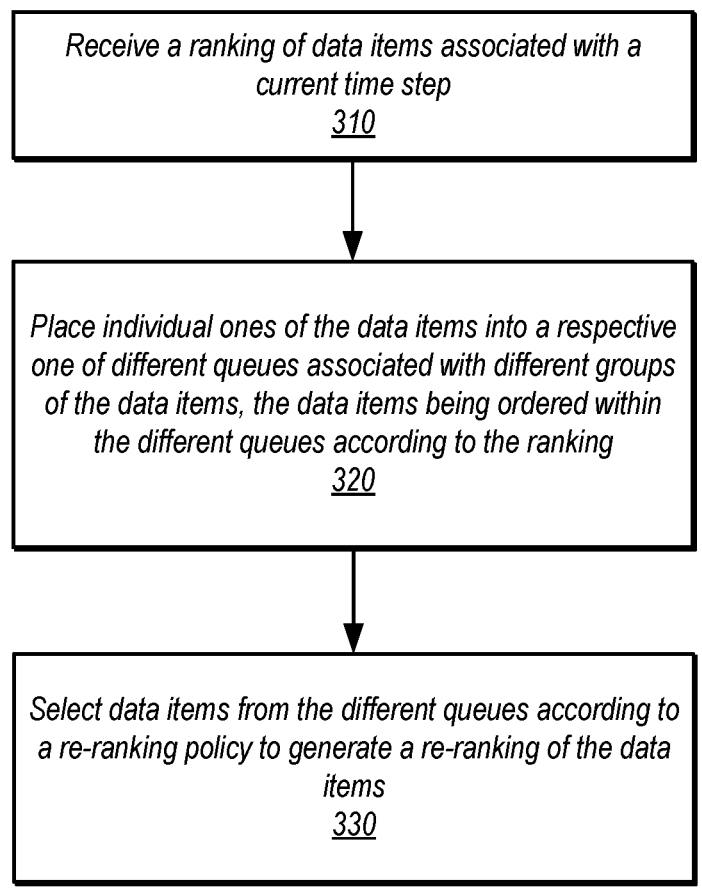
FIG. 3 is a flow diagram illustrating methods and techniques for using a re-ranking policy to generate a re-ranking from group queues of data items, according to some embodiments.

FIG. 3 is a flow diagram illustrating methods and techniques for using a re-ranking policy to generate a re-ranking from group queues of data items, according to some embodiments. As indicated at 310, a ranking of data items associated with a current time step may be received, in some embodiments. For instance, a current time step may include one (or more) batches of data items which may have been previously ranked (e.g., within each batch). As indicated at 320, individual ones of the data items may be placed into a respective one of different queues associated with different groups of the data items, the data items being ordered within the different queues according to the ranking, in some embodiments. For example, the relevance values related to an application (e.g., an applicant qualification score), may be used to rank the data items within a queue. This may lead to scenarios where a data item with a higher relevance score is lower in one queue than it would be in another queue (e.g., as different queues may have different data items with different relevance scores).

As indicated at 330, data items may be selected from the different queues according to a re-ranking policy to generate a re-ranking of the data items, in some embodiments. For example, deterministic re-ranking policies like Fair Queues or a learned re-ranking policy, like a re-ranking policy generated by L2SQ as discussed below may be used to select the items. In some embodiments, an additional evaluation (e.g., like Greedy Fair Swap, discussed below) may be performed to modify selections if a selection from a learned re-ranking policy would result in a violation of a ranking constraint.

In some embodiments, the FA*IR technique may be modified and used as a baseline for learning a re-ranking policy. The FA*IR technique may include creating a priority queue for each group, sorted in decreasing order of relevance. To fill each position in the ranking, a section of the most-qualified element at the top of the priority queues may be made, unless that selection would result in a sub-ranking which violates the fairness constraint. In the event of a selection creating sub-ranking that violates the fairness constraint, the technique may attempt to identify a different queue with the next most-qualified top item and pop that top item from that queue instead.

A modified version of the FA*IR technique may be referred to as Fair Queues. This modifications may include applying a non-probabilistic DDP constraint on full rankings (instead of modeling each sub-ranking on n' items using a binomial distribution p(k;n',p) and checking that p(k;n',p)>α as is done in FA*IR). Another modification may be that the fairness definition is based on group exposure in aggregate across multiple time steps and applies to multi-group settings, while the fairness definition in FA*IR may only apply to single rankings with two groups (usually denoted as the protected and non-protected groups).

In various embodiments, a subroutine that checks if a ranking can be completed while satisfying the fairness constraint can be fair. A naive approach would examine every completion of the ranking until it finds a fair completion or until it exhaustively examines all enumerations of ranking completions. Since there are n! rankings on n elements, a heuristic (as discussed below) may be used to find a single ranking completion. If that heuristic-based ranking completion is unfair, can be fair fails, and the Fair Queues technique may not select from the queue in consideration. In the case that all queues were eliminated in this fashion, then a selection from the queue of the group with the minimum exposure may be made.

Using the heuristic discussed below, Fair Queues may have a worst-case complexity of $\Theta(gn^2)$ for a ranking with n items and g groups. The use of a heuristic rather than an exact method for can be fair implies the technique may sometimes over-restrict the action space. However, even with the heuristic, Fair Queues may not allow for selecting a queue which precludes a final fair ranking, as long as there is a queue which allows for a final fair ranking. Therefore, while the reconstructed ranking might be sub-optimal with respect to nDCG, it will be fair whenever possible.

In various embodiments, the heuristic referenced above (which can be referred to as "Can Be Fair Heuristic") may complete a ranking using the same basic framework as Fair Queues—it selects a queue to draw from at each step. However, rather than selecting from the queue with the most relevant top item, it selects from the queue with the least expected exposure if each remaining position is filled by selecting from a random queue. To calculate the expected exposure, the average exposure may be calculated for all remaining open slots in the ranking. Then, the expected exposure for a group may be calculated by assuming that each remaining item in the group's queue receives the average remaining exposure. Then the exposures may be averaged for each group under this assumption, and a selection from the queue with the lowest expected exposure made.

Figure 4:
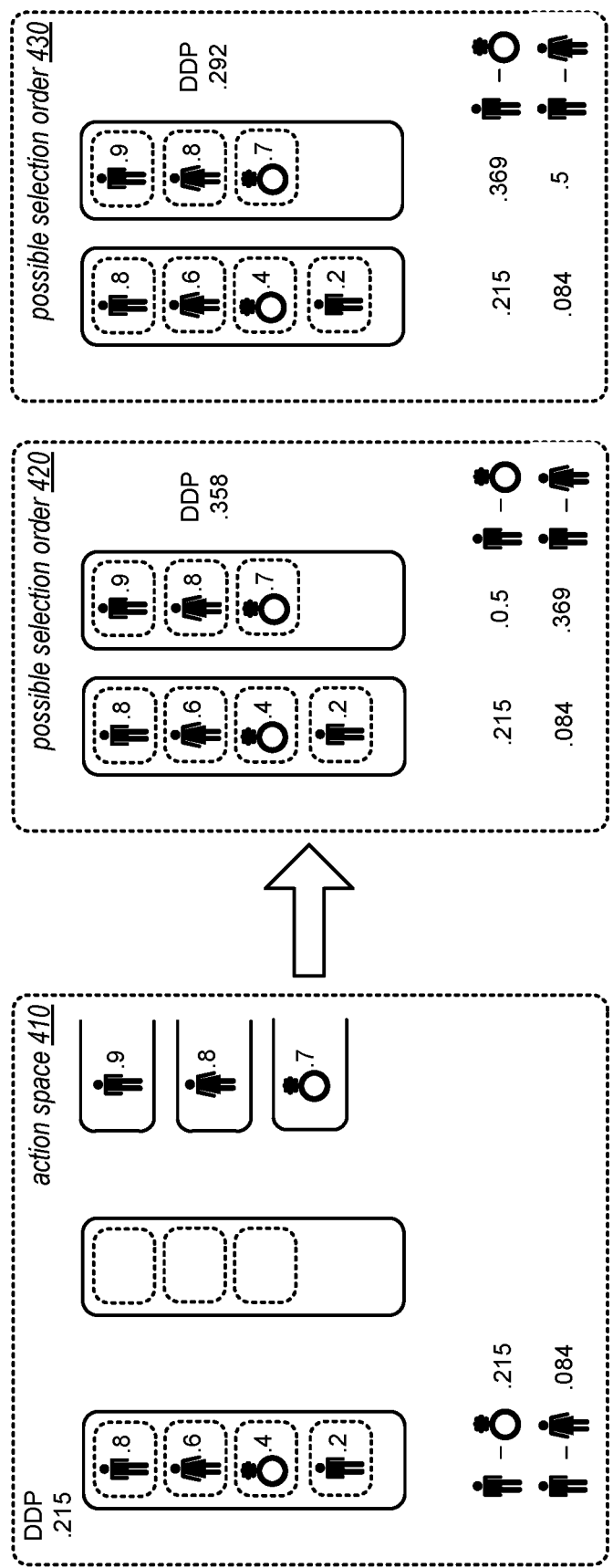
FIG. 4 is logical block diagram illustrating an example of action space pruning as part of a deterministic re-ranking policy, according to some embodiments.

For example, FIG. 4 illustrates an example of pruning possible queue selections using Can Be Fair, according to some embodiments. Action space 410 may illustrate the Can Be Fair for three groups: male, female, and nonbinary. The DDP threshold is 0.25, above which a selection can no longer satisfy the fairness constraint. Applying Can Be Fair may check if a selection can be made from the male queue and still create a fair ranking. Both possible selections 420 and 430 may result in unfair rankings after selecting a male item, indicating that selection from the male queue is not a valid action for this time step, as the DDP for both possible selections 420 and 430 is above the threshold.

In some embodiments, another deterministic re-ranking policy may be "Greedy Fair Swap." Greedy Fair Swap may promote members of a protected group within a single ranking $r^{(t)}$. The Greedy Fair Swap technique, as described in the example pseudo code below, may be implemented to iteratively select the most highly ranked protected member which is still below a non-protected member of a higher exposure group, and swap the non-protected member with the most highly ranked protected member. When the rankings up to time t meet the DDP threshold α, Greedy Fair Swap may terminate.

In various embodiments, Greedy Fair Swap may be described as follows:

Input: Initial ranking $r_{init}$ on items $\{i_1, i_2, \ldots i_n\}$, a group membership function g, a threshold α'
Output: Ranking r on $\{i_1, i_2, \ldots i_n\}$ with DDP(r)≤α'

| | |
|---|---|
| 1: | Initialize $r = r_{init}$ |
| 2: | while DDP(r) > a' do |
| 3: |    Identify the group with the highest exposure $G_h$ |
| 4: |    Identify the group with the lowest exposure $G_l$ |
| 5: |    Set $l = \underset{i_j \in G_l \mid \exists i_{j'} \in G_h, r(i_{j'}) < r(i_j)}{\operatorname{argmin}} r(i_j)$ |
| 6: |    Set $h = \underset{i_j \in G_h \mid r(i_j) < r(l)}{\operatorname{argmin}} r(i_j)$ |
| 7: |    Swap l and h in r |
| 8: | end while |
| 7: | Return r. |

Deterministic policies like Greedy Fair Swap and Fair Queues discussed above may act when required, which may allow the DDP measure to stay close to the threshold of the fairness constraint. Learning techniques, such as those discussed below, may allow for a re-ranking policy that is more proactive, avoiding scenarios where larger penalties on nDCG may occur in order to satisfy the fairness. In some embodiments, a locally optimal learning to search (LOLS) framework may be applied to learn a policy by imitating and extending a reference policy. Since the learned policy provably has low regret on deviations from the reference, it is possible to improve upon the performance of the reference. The learned policy can be trained so as to predict an action from features derived from the state space at a given time step.

LOLS may construct a training example by "rolling in" up to a given number of time steps according to the learned policy. For every action in the action space, LOLS "rolls out" using the reference policy (or possibly a mixture of the reference and the learned policy), as discussed below with regard to FIG. 5. This roll out terminates at an end state, and a score can be assigned to that end state. Using these scores, the model learns to prioritize actions which led to high scoring end states at a given time step.

Figure 5:
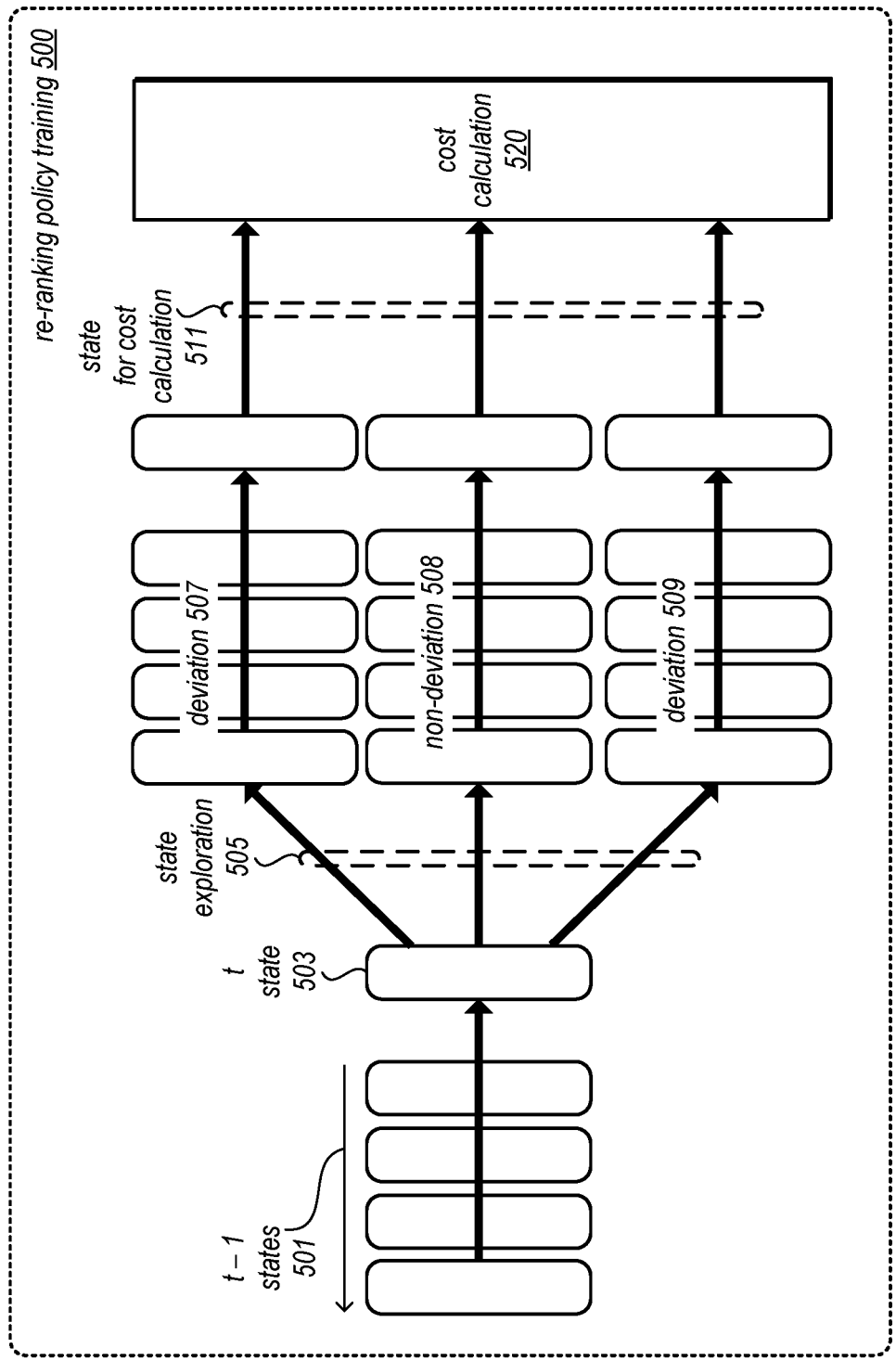
FIG. 5 is a logical block diagram illustrating learning to search for a re-ranking policy from queues, according to some embodiments.

FIG. 5 is a logical block diagram illustrating learning to search for a re-ranking policy from queues, according to some embodiments. A current time, t, may have a current state to be considered for training a current re-ranking policy, as indicated at 503, as part of re-ranking policy training 500. The current re-ranking policy may been trained according to a number of previous states, such as t−1 states, as indicated at 501. State exploration 505 may be performed, as part of re-ranking policy training 500. For example, rollout without non-deviation from a reference policy may be performed, as indicated at 508, for a number of actions (e.g., picking items from different group queues) producing a number of non-deviation states 508. Deviation from the reference policy may also be performed to explore other states, such as deviation 507 and 509. For example, one form of deviation may select from an opposite (or different queue) than is indicated by the reference policy. Another form of deviation may be to use a mixture policy that alternates or combines actions specified by both a current learned policy and a mixture policy to select a queue from which to obtain a data item.

As indicated at 511, an end state for each set of explored states (e.g., 507, 508, and 509) may be provided for cost calculation, as indicated at 520. For instance, in some embodiments, the cost of an action may be calculated using the average nDCG over all batches after rollout, after rollout, or $nDCG(\pi_i^{out}(\tau'),T)$.

In various embodiments, Locally Optimal Learning to Search with Queues (L2SQ) may be implemented, merging the learning to search technique discussed above with the queue-based ranking procedure as discussed above with regard to Fair Queues. Concretely, a scoring model may be created (e.g. using a feed forward neural network) that maps from a partial ranking and a collection of queues (e.g., one per group) to a score for each queue. A selection may be made from the queue with the top score from the model, rather than the queue with the most-relevant item. In some embodiments, the L2SQ model may be implemented to learn to maintain a fairness buffer well below the DDP threshold, allowing the model to take advantage of incoming batches with highly relevant items from a high-exposure group.

To implement the LOLS framework, a reference policy may be identified, a parametrization of the state and action spaces may be utilized, and a cost function to be applied at the end of roll-outs may be determined. At training time, training examples may be constructed where each example consists of a rolled-in set of rankings up to some time step (described below) and a choice of queues from which to select the next element of the current ranking. Then, roll out may be performed for each possible choice of queue to obtain costs for each queue. From this pairing of state and costs, multiple training examples may be constructed to update the scoring model. To construct a set of rankings at inference time, the scoring model may be applied for each slot of each ranking, filling in slots with the top item from the highest-scoring queue at each step.

The search space may be parametrized over queues (rather than over items) because DDP is based on groups and is agnostic to the choice of individual elements within a group.

Different reference policies can be used in various embodiments. For example, any ranking policy can be used as the reference policy, such as the Fair Queues technique discussed above or Greedy Fair Swap.

Various features may be used to encode the state space, in different embodiments. For example, in one embodiment, the state space may be encoded using 17 features per group: mean exposure and percentage of the group in previous batches, total number of items in current ranking, statistics of relevance scores and ranks for items which have already been ranked (min, max, mean, standard deviation), the relevance score of the top item in the queue, size of the queue, and statistics of relevance scores for the queue (min, max, mean, standard deviation). The model may be parameterized using a feedforward neural network, which takes as input all features for all groups and outputs a vector of scores, one per group, in some embodiments.

In various embodiments, the action space may include all selections from non-empty queues which can result in a ranking that satisfies the ranking constraint. Fair Queues could, for example, be used to restrict the action space for L2SQ, in some embodiments.

In various embodiments, to create training examples, roll-in may be performed up to a certain time step, selection may be simulated from each non-restricted queue, then roll-out may be performed from each simulated choice to compute a loss function. The policy used for roll-out may be a mixture of the learned policy and the reference policy, where the reference policy is selected with probability β in some embodiments. The score of each queue may be calculated using the average nDCG over all batches after rollout. An illustration of roll-out with two groups (male/female), four time steps, and a DDP threshold of 0.25 is shown in FIG. 6.

Figure 6:
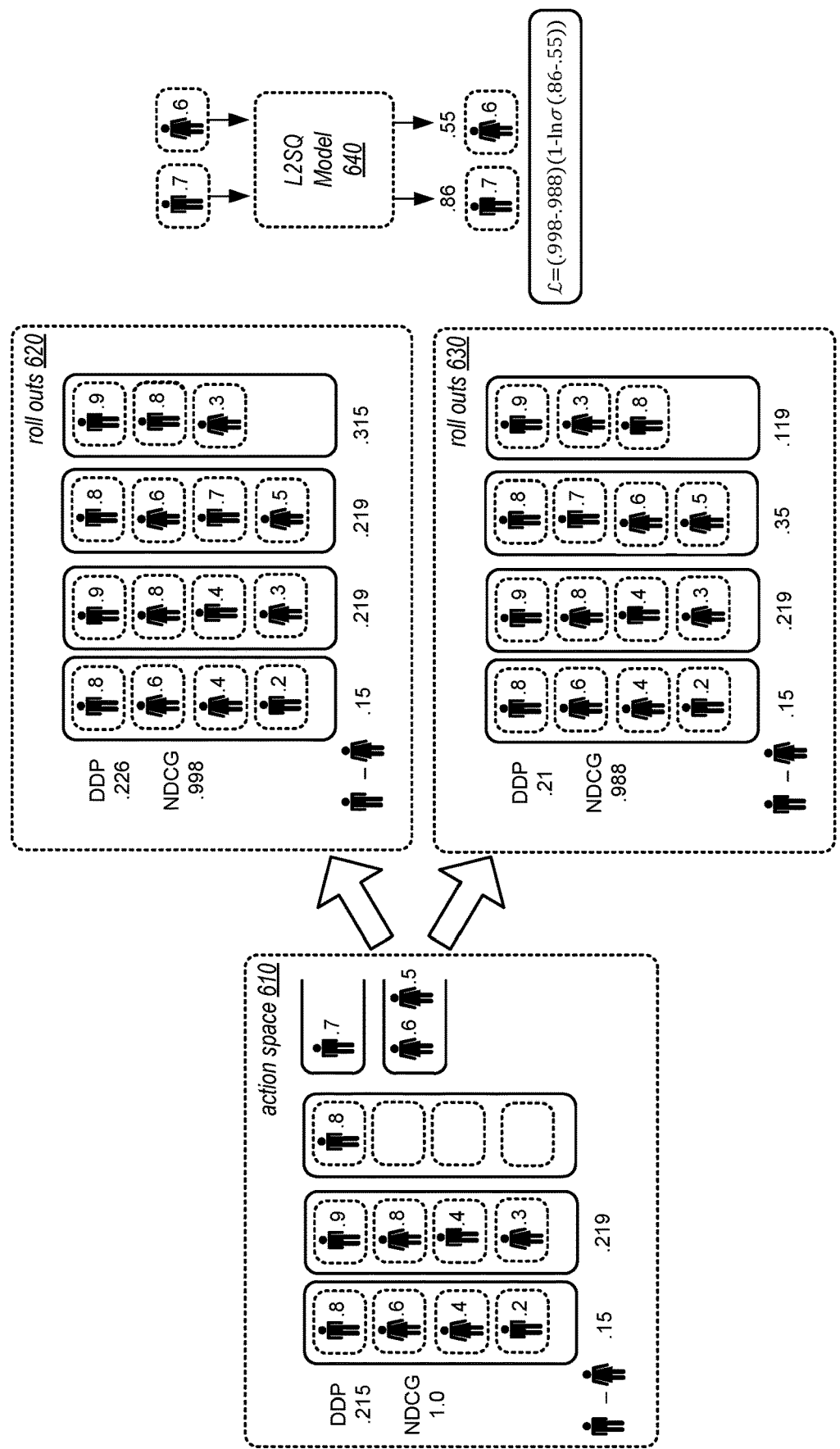
FIG. 6 is logical block diagram illustrating an example roll out and loss function computation at a single time step, according to some embodiments.

FIG. 6 is logical block diagram illustrating an example roll out and loss function computation at a single time step, according to some embodiments. For example, action space 610 indicates a relevance of each item, as well as the difference in male and female exposures for each completed batch. Roll outs 620 and 630 show different selections from each queue. The loss may be a function of the post-roll-out nDCGs and model 640's scores (L=(0.998−0.988)(1−ln σ(0.86−0.55)). Model 610's scores may encode the preferences of model 610 for selecting from each group's queue, not the relevance values of particular items.

In various embodiments, multiple pairwise examples may be created per state, comparing each queue to the queue with the highest post-roll-out nDCG for training examples. The L2SQ model may assign each queue in the pair a score. A Bayesian Personalized Ranking loss may be determined based on the pair of scores and final nDCGs for the two queues. If $Q_1$ is the queue with the highest final nDCG, then for every non-restricted $Q_2$ at a given timestamp t, the loss may be calculated as $l(Q_2,t)=(nDCG(Q_1)-nDCG(Q_2)(1-\ln \sigma(f(Q_1)-f(Q_2)))$ where σ may be the score of the model for a queue. In some embodiments, losses may not be calculated for actions which are restricted by the Can Be Fair technique. An example of a loss function calculation is discussed above with regard to FIG. 6.

In various embodiments, at inference time, the scoring model may be applied for each slot of each ranking, filling in slots with the top item from the highest-scoring queue at each step. The Can Be Fair restriction may be applied on the action space at inference time as well, to ensure that the generated rankings are fair, in some embodiments. Because of the Can Be Fair restriction on the action space, the L2SQ model may have a worst-case complexity of $\Theta(gn^2)$ at inference time for a ranking with n items and g groups.

Figure 7:
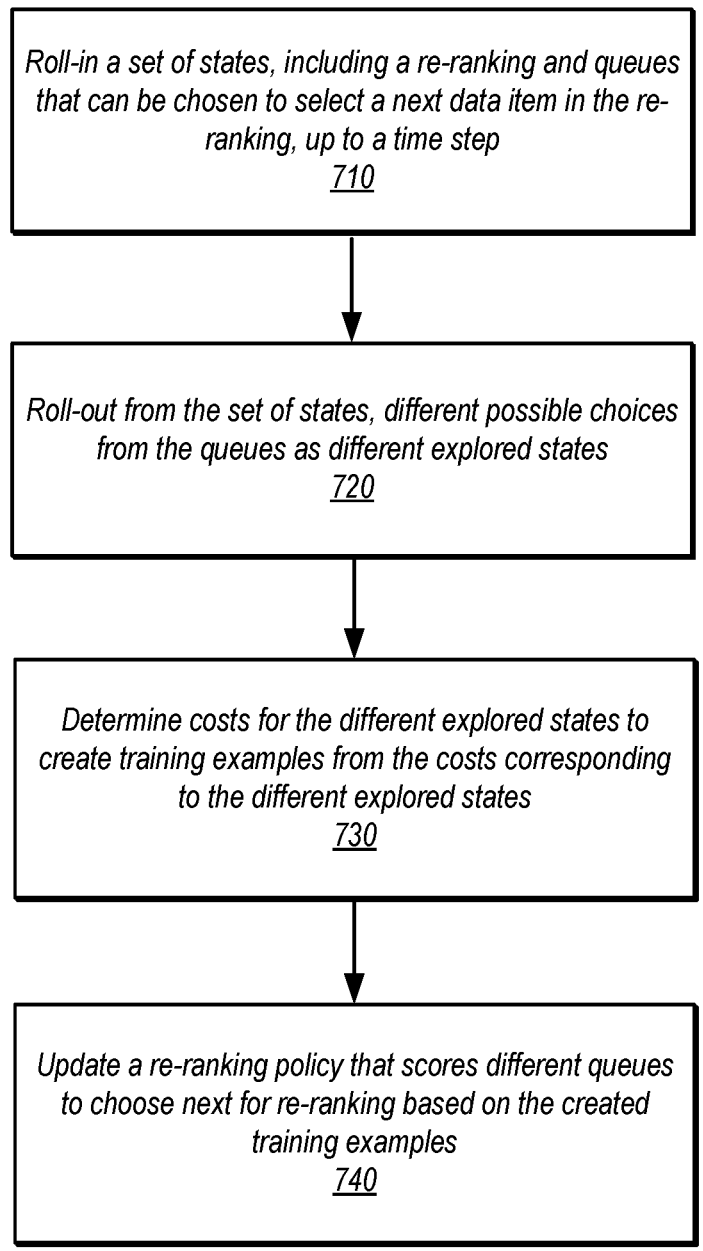
FIG. 7 is a flow diagram illustrating methods and techniques for performing learning to search for a re-ranking policy from queues, according to some embodiments.

FIG. 7 is a flow diagram illustrating methods and techniques for performing learning to search for a re-ranking policy from queues, according to some embodiments. As indicated at 710, a set of states, including a re-ranking and queues that can be chosen to select a next data item in the re-ranking, may be rolled-in, up to a time step (e.g., t in FIG. 5). As indicated at 720, roll-out from the set of states may be performed. For example, different choices from the queues may be made as different explored states. As discussed above, the reference policy, a mixture of policies, or other deviations may be used to explore states.

As indicated at 730, costs may be determined for the different explored states to create training examples from the costs corresponding to the different explored states, in some embodiments. For example, cost of a state may be calculated using the average nDCG over all batches after rollout, after rollout, or $nDCG(\pi_i^{out}(\tau'),T)$. The training examples may then be used to update a re-ranking policy that scores different queues to choose next for re-ranking based on the created training examples, in some embodiments, as indicated at 740.

In various embodiments, queues may be used in a LOLS framework to provide a fair ranking and may be referred to herein as L2SQ, as discussed above. In various embodiments, the L2SQ training technique may be described as follows:

Input: Sets of initial rankings $\{R_{init}^{(n)}\}_{n=1}^{N}$, mixture parameter β≥0, and roll-out horizon h.

```
1:  for n ∈ {1, 2, ... ,N} do
2:      R_init ← R_init^(n)
3:      for t ∈ {1,2, ... , T} do
4:          Roll-in t − 1 rounds to reach r_init^(t) ∈ R_init
5:          Create priority Q_g (ordered by decreasing relevance)
                for all groups g
6:          Initialize r^(t) = ∅
7:          while |Q_g| > 0 for at least 2 groups g do
8:              for g ∈ { 1,2, ... , G} do
9:                  if |Q_g| > 0 and can_be_fair(r^(t), (Q_g) then
10:                     Copy r'^(t) ← r^(t)
11:                     Insert Q_g.pop( ) into r'(t)
12:                     Apply roll-out policy to fill r'^(t) and the next
                            h batches r'^(t + 1), ... r'^(t + h)
13:                     Compute cumulative nDCG after roll-out for
                            group g
14:                 For all rolled-out g, compute cost = max nDCG for any
                        for any group minus nDCG of g
15:                 Construct training example from groups g
16:                 Compute BPR loss
17:                 Apply roll-out policy to insert (Q_g.pop( ) into r^(t)
18:             Update model with total BPR loss
```

Figure 8:
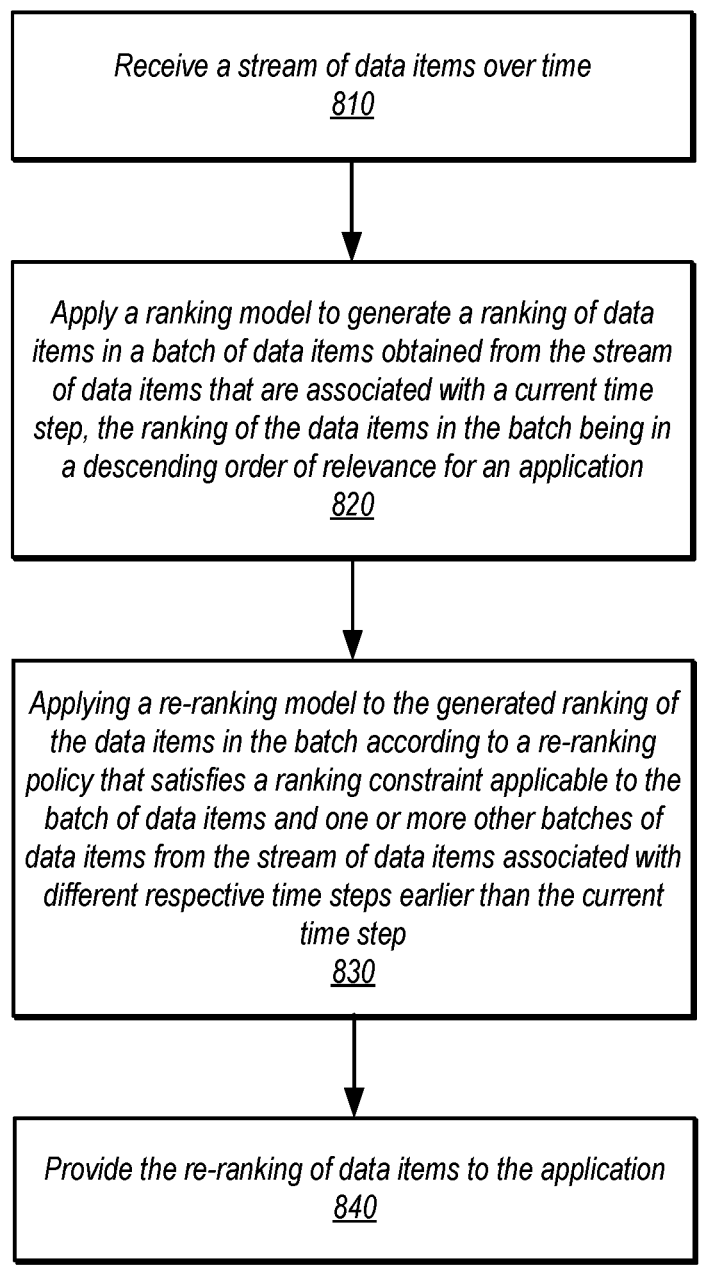
FIG. 8 is a flow diagram illustrating methods and techniques for online post-processing in rankings for constrained utility maximization, according to some embodiments.

FIG. 8 is a flow diagram illustrating methods and techniques for online post-processing in rankings for constrained utility maximization, according to some embodiments. The techniques discussed above may be applied in various ways, including those features discussed below with regard to FIG. 8. For example, as indicated at 810, a stream of data items may be received over time, in various embodiments. These data items may be received from an application or for an application that may utilize a ranking of the data items in the data stream, in various embodiments. As discussed above, many different types of applications may utilize rankings of data items.

A batch of the data items may be obtained from the data stream. The data items may be associated with a current time step (e.g., all data items received within an interval of time from a current time to a prior point in time, such as within the last hour). As indicated at 820, a ranking model may be applied to generate a ranking of data items in the batch of data items, in some embodiments. For example, the ranking model may be a machine learning model trained to rank items in a descending order of relevance with respect to an objective of an application that receives the ranking.

As indicated at 830, a re-ranking model may then be applied to the generated ranking of data according to a re-ranking policy that satisfies a ranking constraint applicable to the batch of data items and one or more other batches of data items from the stream of data items associated with different time steps earlier than the current time step. As discussed above, different types of ranking constraints, such as fairness constraints or parity constraints (which may also implicate fairness) may be considered. In at least some embodiments, multiple ranking constraints may be satisfied using similar techniques. As discussed above, deterministic re-ranking policies and/or a learned re-ranking policy may be applied. These policies may make decisions to re-ranking considering earlier batches in addition to the current batches, such as the features discussed above, including maximizing $nDCG(\tau,T)$ subject to the constraint $\max_{1 \leq t \leq T} DDP(\tau,t) \leq \alpha$. In at least some embodiments, an additional fairness constraint may be deployed (e.g., for a learned policy, such as L2SQ) to guarantee that the fairness constraint is satisfied by a re-ranking, as discussed above.

As indicated at 840, the re-ranking of data items may be provided to the application, in some embodiments. For example, the re-ranking of data items may be sent via an interface, protocol, or other communication established with the application.

Figure 9:
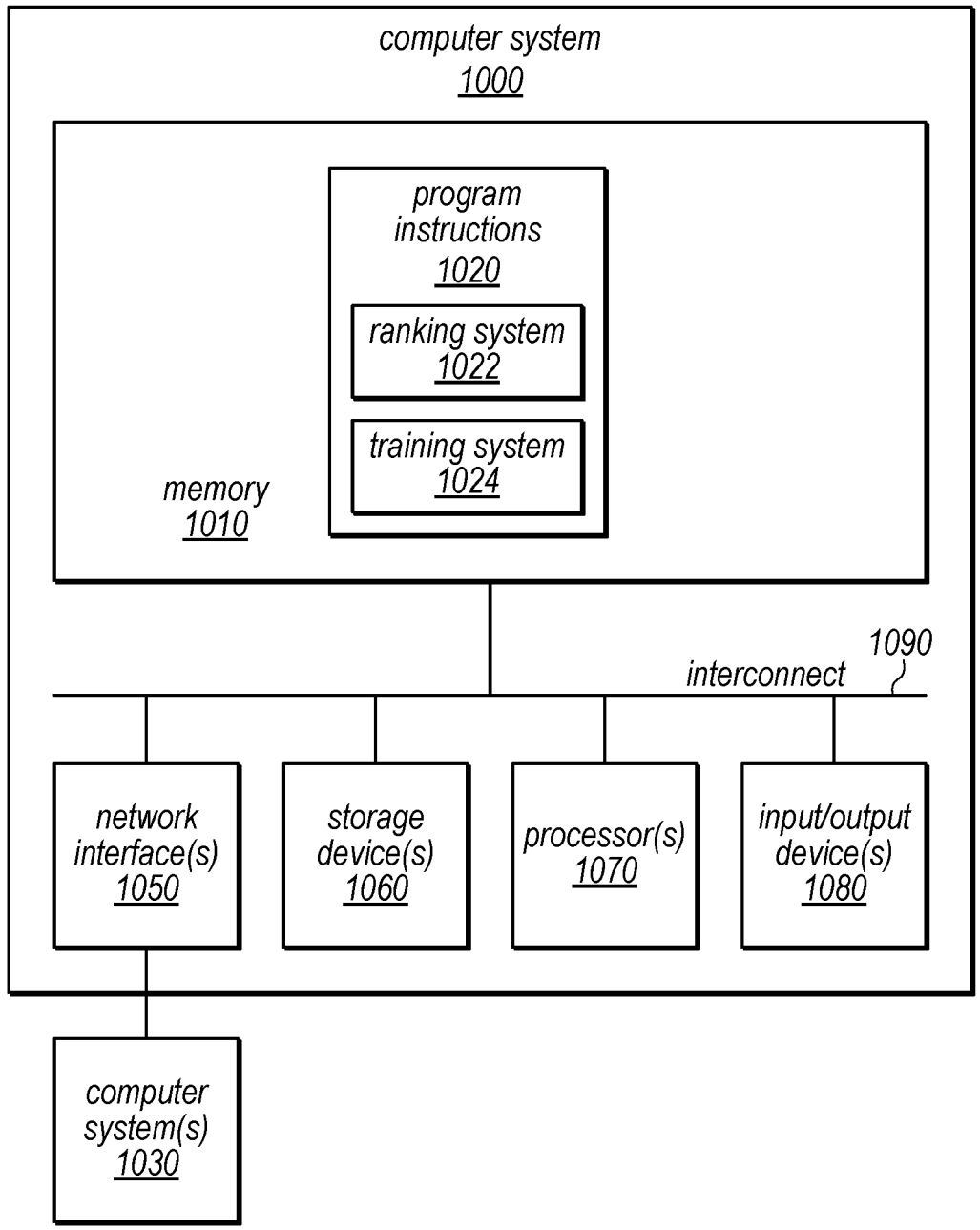
FIG. 9 illustrates an example computing system, according to some embodiments.

FIG. 9 illustrates a computing system configured to implement the methods and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing online post-processing in rankings for constrained utility maximization, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc.) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement various features described above, including a ranking system 1022 and training system 1024 as discussed above with regard to FIG. 1 that may perform the various training and application of re-ranking models, in some embodiments as described herein. Program instructions 1020 may be encoded in platform native binary, any interpreted language such as Java™ byte-code, or in any other language such as C/C++, Java™, etc. or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:
    at least one processor;
    a memory, comprising program instructions that when executed by the at least one processor cause the at least one processor to implement a ranking system providing fairness across a plurality of rankings, the ranking system configured to:
        receive a stream of data items over time;
        provide, as part of continuous monitoring of the ranking system, respective fair rankings of respective pluralities of data items for a plurality of time steps including a current time step and one or more time steps earlier than the current time step, wherein to provide a fair ranking for the current time step the ranking system is configured to:
            apply a ranking model to generate a ranking of a plurality of data items in a batch of data items obtained from the stream of data items, wherein the batch of data items are associated with the current time step, and wherein the ranking model is a machine learning model trained to generate the ranking of the plurality of data items in the batch in a descending order of relevance for an application;
            apply a re-ranking model to generate a fair ranking of the plurality of data items in the batch, wherein an order of the fair ranking is different from the descending order of relevance for the application; wherein the re-ranking model is applied according to a re-ranking policy that satisfies a fairness constraint applicable, in aggregate, to the generated ranking for the batch of data items and respective generated fair rankings for one or more other batches of data items from the stream of data items associated with different respective time steps earlier than the current time step, wherein the one or more other batches of data items were previously ranked using the ranking model and re-ranked, using the re-ranking model, with respective fair rankings of one or more further batches with respective time steps earlier than the different respective time steps of the one or more other batches before being sent to the application, wherein the fairness constraint is determined based on parity between different groups associated with individual ones of the plurality of data items; and
        send the fair ranking of the plurality of data items to the application.

2. The system of claim 1, wherein the re-ranking policy is trained by a learning to search technique that iteratively selects data items from different queues corresponding to the different groups associated with the individual ones of the plurality of data items according to a reference policy when re-ranking one or more other batches of data items from a test data set and wherein respective deviations are made from a reference policy when making individual selections from the different queues.

3. The system of claim 1, wherein the re-ranking policy is trained by a learning to search technique that iteratively selects data items from different queues corresponding to the different groups associated with the individual ones of the plurality of data items according to a reference policy when re-ranking one or more other batches of data items from a test data set and wherein respective deviations are made from a combination of a reference policy and a previously learned policy when making individual selections from the different queues.

4. The system of claim 1, wherein the re-ranking model applies a deterministic re-ranking policy.

5. The system of claim 4, wherein the deterministic re-ranking policy finds a most highly ranked data item for a protected member which is below a data item for a non-protected member in the ranking of the batch of items and swaps the data item for the protected member with the most highly ranked data item for the protected member with the data item for the non-protected member in the ranking of the batch of items.

6. A method of providing fairness across a plurality of rankings, comprising:
    receiving, by a ranking system, a stream of data items over time;
    providing, as part of continuous monitoring of the ranking system, respective fair rankings of respective pluralities of data items for a plurality of time steps including a current time step and one or more time steps earlier than the current time step, wherein providing a fair ranking for the current time step comprises:
        applying, by the ranking system, a ranking model to generate a ranking of a plurality of data items in a batch of data items obtained from the stream of data items, wherein the batch of data items are associated with the current time step, and wherein the ranking model is a machine learning model trained to generate the ranking of the plurality of data items in the batch in a descending order of relevance for an application;
        applying, by the ranking system, a re-ranking model to generate a fair ranking of the plurality of data items in the batch, wherein an order of the fair ranking is different from the descending order of relevance for the application; wherein the re-ranking model is applied according to a re-ranking policy that satisfies a ranking constraint applicable, in aggregate, to the generated ranking for the batch of data items and respective generated fair rankings for one or more other batches of data items from the stream of data items associated with different respective time steps earlier than the current time step, wherein the one or more other batches of data items were previously ranked using the ranking model and re-ranked, using the re-ranking model, with respective fair rankings of one or more further batches with respective time steps earlier than the different respective time steps of the one or more other batches before being sent to the application, wherein the ranking constraint is determined based on parity between different groups associated with individual ones of the plurality of data items; and providing, by the ranking system, the fair ranking of the plurality of data items to the application.

7. The method of claim 6, wherein the re-ranking policy is trained by a learning to search technique that iteratively selects data items from different queues corresponding to different groups of data items according to a reference policy when re-ranking one or more other batches of data items from a test data set and wherein respective deviations are made from a reference policy when making individual selections from the different queues.

8. The method of claim 6, wherein the re-ranking policy is trained by a learning to search technique that iteratively selects data items from different queues corresponding to the different groups associated with the individual ones of the plurality of data items according to a reference policy when re-ranking one or more other batches of data items from a test data set and wherein respective deviations are made from a combination of a reference policy and a previously learned policy when making individual selections from the different queues.

9. The method of claim 6, wherein the re-ranking model applies a deterministic re-ranking policy.

10. The method of claim 9, wherein the deterministic re-ranking policy finds a most highly ranked data item associated with a first group which is below a data item associated with a second group in the ranking of the batch of items and swaps the data item associated with the second group with the most highly ranked data item in the ranking of the batch of items.

11. The method of claim 6, wherein the re-ranking policy satisfies a plurality of ranking constraints applicable to the batch of data items and one or more other batches of data items from the stream of data items including the ranking constraint.

12. The method of claim 6, wherein the ranking constraint is a fairness constraint.

13. The method of claim 12, wherein the fairness constraint is demographic disparity.

14. One or more non-transitory, computer-readable storage media, storing program instructions that when executed on or across one or more computing devices, cause the one or more computing devices to implement a ranking system providing fairness across a plurality of rankings, comprising:

receiving, by a ranking system, a stream of data items over time;

providing, as part of continuous monitoring of the ranking system, respective fair rankings of respective pluralities of data items for a plurality of time steps including a current time step and one or more time steps earlier than the current time step, wherein providing a fair ranking for the current time step comprises:

performing, by the ranking system, a first ranking of a plurality of data items in a batch of data items obtained from the stream of data items, wherein the batch of data items are associated with the current time step, and wherein the initial ranking is generated using a ranking model that is a machine learning model trained to generate the first ranking of the plurality of data items in the batch in a descending order of relevance for an application;

re-ranking, by the ranking system, the first ranking of the plurality of data items in the batch to generate a second ranking of the plurality of data items in the batch according to a re-ranking policy that satisfies a ranking constraint applicable, in aggregate, to both the batch of data items and one or more other batches of data items from the stream of data items associated with different respective time steps earlier than the current time step, wherein the one or more other batches of data items were previously ranked using the ranking model and re-ranked, using the re-ranking model, with respective rankings of one or more further batches with respective time steps earlier than the different respective time steps of the one or more other batches before being sent to the application, wherein the ranking constraint is determined based on parity between different groups associated with individual ones of the plurality of data items; and sending, by the ranking system, the re-ranking of the plurality of data items to the application.

15. The one or more non-transitory, computer-readable storage media of claim 14, wherein the re-ranking policy is trained by a learning to search technique that iteratively selects data items from different queues corresponding to the different groups associated with the individual ones of the plurality of data items according to a reference policy when re-ranking one or more other batches of data items from a test data set and wherein respective deviations are made from a reference policy when making individual selections from the different queues.

16. The one or more non-transitory, computer-readable storage media of claim 14, wherein the re-ranking policy is trained by a learning to search technique that iteratively selects data items from different queues corresponding to different groups associated with the individual ones of the plurality of data items according to a reference policy when re-ranking one or more other batches of data items from a test data set and wherein respective deviations are made from a combination of a reference policy and a previously learned policy when making individual selections from the different queues.

17. The one or more non-transitory, computer-readable storage media of claim 14, wherein the re-ranking policy is a deterministic re-ranking policy.

18. The one or more non-transitory, computer-readable storage media of claim 17, wherein the deterministic re-ranking policy finds a most highly ranked data item associated with a first group which is below a data item associated with a second group in the ranking of the batch of items and swaps the data item associated with the second group with the most highly ranked data item in the ranking of the batch of items.

19. The one or more non-transitory, computer-readable storage media of claim 14, wherein the re-ranking policy satisfies a plurality of ranking constraints applicable to the batch of data items and one or more other batches of data items from the stream of data items including the ranking constraint.

20. The one or more non-transitory, computer-readable storage media of claim 14, wherein the ranking constraint is a fairness constraint.

\* \* \* \* \*